(12) United States Patent
Sotoyama et al.

(10) Patent No.: US 7,032,893 B2
(45) Date of Patent: Apr. 25, 2006

(54) GAS-LIQUID CONTACT APPARATUS, GAS-LIQUID CONTACT METHOD, LIQUID DEODORIZING METHOD, AROMATIC COMPONENT PRODUCING METHOD, AND FOOD AND DRINK

(75) Inventors: Kazuyoshi Sotoyama, Hiratsuka (JP); Keiji Iwatsuki, Yokohama (JP); Teruhiko Mizota, Yokohama (JP); Yuzo Asano, Yokohama (JP); Masayuki Akiyama, Yamato (JP); Yuriko Iiyama, Tokyo (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 158 days.

(21) Appl. No.: 10/433,576

(22) PCT Filed: Nov. 15, 2001

(86) PCT No.: PCT/JP01/09975

§ 371 (c)(1),
(2), (4) Date: Jun. 5, 2003

(87) PCT Pub. No.: WO02/055187

PCT Pub. Date: Jul. 18, 2002

(65) Prior Publication Data

US 2004/0026800 A1    Feb. 12, 2004

(30) Foreign Application Priority Data

Jan. 5, 2001   (JP) .................... 2001-000563
Apr. 24, 2001  (JP) .................... 2001-126577
Jul. 9, 2001   (JP) .................... 2001-208163

(51) Int. Cl.
    *B01F 3/04*    (2006.01)
(52) U.S. Cl. ........................ 261/89; 426/488

(58) Field of Classification Search ............. 261/89, 261/90; 426/486–488; 554/175, 177
See application file for complete search history.

(56) References Cited

U.S. PATENT DOCUMENTS

| | | | | |
|---|---|---|---|---|
| 1,858,570 A | * | 5/1932 | Aurig et al. ............ | 261/90 |
| 1,888,872 A | * | 11/1932 | D'Yarmett ............ | 261/89 |
| 2,387,231 A | * | 10/1945 | Bottoms et al. ........ | 261/89 |
| 3,168,596 A | * | 2/1965 | Jamison ............... | 261/89 |
| 3,620,509 A | * | 11/1971 | Roman ................ | 261/18.1 |
| 3,855,369 A | * | 12/1974 | Boler ................. | 261/90 |
| 3,861,891 A | * | 1/1975 | Noguichi et al. ....... | 96/281 |
| 4,202,846 A | * | 5/1980 | Shafranovsky et al. .. | 261/142 |
| 5,366,667 A | * | 11/1994 | Le Goff ............... | 261/153 |

FOREIGN PATENT DOCUMENTS

AU    62264/73    5/1975
EP    0 191 625   8/1986

(Continued)

Primary Examiner—Richard L. Chiesa
(74) Attorney, Agent, or Firm—Nixon & Vanderhye P.C.

(57) ABSTRACT

Vapor-liquid contacting equipment includes a contact column in which a test liquid flows from top to bottom and a vapor flows from bottom to top, a rotary shaft which is inserted vertically in the contact column, rotors which are provided at different heights on the shaft, and which convert the test liquid into a thin film by centrifugal force and then discharge the test liquid from the outer periphery thereof, and trays which receive the test liquid discharged from an upper rotor and guide the test liquid to the center of a lower rotor. The rotors have furrows, which the test liquid flows over when the filmy test liquid flows out from the center of the rotor towards the outer periphery.

19 Claims, 10 Drawing Sheets

FOREIGN PATENT DOCUMENTS

| | | |
|---|---|---|
| JP | 39-6933 | 5/1964 |
| JP | 47-15375 | 8/1972 |
| JP | 47-20953 | 10/1972 |
| JP | 56-13002 | 2/1981 |
| JP | 6-133703 | 5/1994 |
| JP | 6-194073 | 11/1994 |

* cited by examiner

RESULTS OF GAS CHROMATOGRAPHY ANALYSIS OF COFFEE

PRIOR TO RECOVERING AROMA

AFTER RECOVERING AROMA COMPONENT

A: pyridine
B: 2-methylpyrazine
C: 2-ethyl-6-methylpyrazine
D: 2-ethyl-5-methylpyrazine
E: 2-ethyl-3-methylpyrazine
F: 2, 5-dimethyl-3-ethylpyrazine
G: furfuryl acetate
H: 5-methyl-2-furfural

RESULTS OF GAS CHROMATOGRAPHY ANALYSIS OF AQUEOUS SOLUTION OF WHEY

PRIOR TO DEODORIZATION

AFTER DEODORIZATION

A: hexanal
B: heptanal
C: 2-amylfuran
D: 1-pentanol
E: nonanal
F: 2-ethylhexanol RESULTS OF GAS CHROMATOGRAPHY ANALYSIS OF AQUEOUS SOLUTION OF SKIM MILK POWDER CONDENSED BY UF FILTER

PRIOR TO DEODORIZATION

AFTER DEODORIZATION

A: undecane

A: heptanal
B: 2-amylfuran
C: 2-nonanone
D: 2-undecanone
E: 2, 4-decadienal

RESULTS OF GAS CHROMATOGRAPHY ANALYSIS OF SOYMILK

A: t, 2-pentanal
B: 2-amylfuran
C: 1-hexanol
D: 1-octen-3-ol
E: benzaldehyde

GAS-LIQUID CONTACT APPARATUS, GAS-LIQUID CONTACT METHOD, LIQUID DEODORIZING METHOD, AROMATIC COMPONENT PRODUCING METHOD, AND FOOD AND DRINK

This application is a national stage of International Application No. PCT/JP01/09975, filed on Nov. 15, 2001.

TECHNICAL FIELD

The present invention relates to a vapor-liquid contacting equipment and a vapor-liquid contacting method in which rotors provided inside an airtight contact column are rotated in a constant direction, while a test liquid is sent flowing down from the top of the contact column, and the test liquid forms a thin film on a rotor, is discharged from the periphery of the rotor, and is then caught and flows sequentially downward to a lower rotor, and in this manner flows sequentially downward from the top of the contact column to the bottom, while contacting a vapor which moves up from the bottom of the contact column to the top. The present invention also relates to a liquid deodorizing method using this vapor-liquid contacting equipment, an aroma component production method, and a food or beverage containing the aroma component.

BACKGROUND ART

The following conventional vapor-liquid contacting equipments are known.

In a vapor-liquid contacting equipment disclosed in Japanese Unexamined Patent Application, First Publication No. Sho 47-15375, the inside of the contact column is partitioned into a plurality of contact chambers by divider plates (trays), each having a flowing hole in the center section thereof. The test liquid undergoes diffusion spraying (is discharged) by a rotor provided in each contact chamber and is caught by the divider plate (tray) and flows sequentially down through the flowing hole to the rotor below, and undergoes forced contact with a vapor introduced into the contact column, thereby achieving contact between the test liquid and the vapor.

A centrifugal turning contact tray disclosed in Japanese Examined Patent Application, Second Publication No. Sho. 58-21523 is fixed inside a contact column where the test liquid and the vapor are contacted, and comprises a circular disc which is fixed so as not to rotate, a circular hydroseal formed from two tubular rings which is provided on this circular disc, arched slots for vapor transmission which are formed in the circular disc and extend towards the periphery of the circular disc, and a curved disc in the shape of an Archimedes spiral which circulates the test liquid.

A counterflow contact device disclosed in Japanese Examined Patent Application, Second Publication No. Hei. 7-22646 comprises a housing (contact column) which has a vertical longitudinal shaft, a rotatable central shaft, a cone shaped rotor which is mounted on the central shaft, fins which are formed underneath the cone shaped rotor and extend in a radially outward direction, and a frustum surface (trays) immediately beneath the cone shaped rotor, wherein the test liquid flows over the surface of the cone shaped rotor and is contacted with the vapor.

A trickle film vapor-liquid contacting equipment disclosed in Japanese Unexamined Patent Application, First Publication No. Hei. 6-194073 comprises a spiral base made from a heat transfer material which sends the liquid to be processed (the test liquid) flowing down in a filmy condition, and a wall made of a heat transfer material which is in thermal contact with the base. The base and the wall are formed from a vertical stack of plates which display angular excursion with respect to one another due to the rotation of the base about its axis.

In this conventional technology, rotors provided inside the contact column are rotated in a constant direction, while a test liquid such as a slurry or a solution is sent flowing down from the top of the contact column to the rotors and the trays, and the test liquid spreads thinly on the rotors and flows sequentially downward to the rotors and trays below, and during this process contacts a vapor (for example steam or the like) which is simultaneously blown in from the bottom of the contact column to the top, thereby offering a practical device which achieves an efficient contact between a vapor and a liquid.

Such a vapor-liquid contacting equipment is used mainly to produce aroma component liquids by assimilating a flavor component in the test liquid into the steam and collecting the aroma component, or to deodorize test liquids, or the like.

In such a vapor-liquid contacting equipment, the vapor-liquid contacting efficiency should preferably be as high as possible, and the development of devices with even higher contacting efficiency is desirable. Specifically, if the contacting efficiency is improved, the height of the contact column can be reduced, and consequently, there are advantages in that the entire device can be made smaller, and the cost of investment can be reduced.

DISCLOSURE OF INVENTION

An object of the present invention is to provide a vapor-liquid contacting equipment which has high vapor-liquid contacting efficiency, is capable of continuous operation for extended periods, and which has a low investment cost and running costs.

Another object of the present invention is to provide a vapor-liquid contacting method which has high vapor-liquid contacting efficiency, is capable of continuous operation for extended periods, and which has a low investment cost and running costs.

Yet another object of the present invention is to provide a liquid deodorizing method which uses such a vapor-liquid contacting method, an aroma component liquid production method, and a food or beverage.

As a result of continuing intensive research into vapor-liquid contacting equipments comprising rotors, the inventors of the present invention discovered that by forming furrows (ridges) and openings which enable vapor transmission in the rotors, the vapor-liquid contacting efficiency could be improved, and were hence able to complete the present invention.

A vapor-liquid contacting equipment of the present invention comprises at least one rotor which spreads a test liquid into a thin film by centrifugal force and causes contact with an ambient vapor, wherein the rotor has at least one furrow for the test liquid to flow over when the filmy test liquid flows out from the center of the rotor towards an outer periphery.

Furthermore, in another aspect of the present invention, the vapor-liquid contacting equipment comprises a contact column in which an inlet for a test liquid and an outlet for a vapor are provided at the top, and an outlet for the test liquid and an inlet for the vapor are provided at the bottom, a rotary shaft which is inserted vertically in the contact column, a plurality of rotors which are provided on the rotary shaft with gaps provided therebetween and which convert the test liquid into a thin film by centrifugal force and then discharge the test liquid from an outer periphery thereof, and trays which receive the test liquid discharged from an upper rotor and guide the test liquid to the center of a lower rotor, wherein the rotors have furrows (ridges) which the test liquid flows over when the filmy test liquid flows out from the center of the rotor towards the outer periphery.

Furthermore, a vapor-liquid contacting method of the present invention is a vapor-liquid contacting method including a process in which, by rotating at least one rotor and then supplying a test liquid onto the rotor, the test liquid is converted into a thin film by centrifugal force, and flows out from a center of the rotor to an outer periphery, while contacting an ambient vapor, wherein by using a rotor in which at least one furrow is formed as the rotor, the test liquid flows over the furrow when the filmy test liquid flows out from the center of the rotor towards the outer periphery.

In addition, in another aspect of the present invention, the vapor-liquid contacting method comprises a process in which, using a vapor-liquid contacting equipment comprising; a contact column in which an inlet for a test liquid and an outlet for a vapor are provided at the top, and an outlet for the test liquid and an inlet for the vapor are provided at the bottom, a rotary shaft which is inserted vertically in the contact column, a plurality of rotors which are provided on the rotary shaft with gaps provided therebetween and which convert the test liquid into a thin film by centrifugal force and then discharge the test liquid from the outer periphery thereof, and trays which receive the test liquid discharged from an upper rotor and guide the test liquid to the center of a lower rotor, wherein the rotors have furrows (ridges) which the test liquid flows over when the filmy test liquid flows out from the center of the rotor towards the outer periphery, the test liquid is sent flowing down from above the rotors which are positioned at different heights, while a vapor is sent flowing from the vapor inlet to the vapor outlet, thereby achieving contact between the filmy test liquid and the vapor.

According to the vapor-liquid contacting equipment and vapor-liquid contacting method of the present invention, when the test liquid is converted into a thin film and flows out from the center of the rotor towards the outer periphery due to the rotation of the rotor, the test liquid flows over the furrows, and the vapor-liquid contacting efficiency is improved. Accordingly, continuous operation for extended periods is possible, and the investment cost and the running costs are reduced.

Furthermore, because the increase in length of the vapor-liquid contacting time enables the height of the contact tower to be designed comparatively lower, the space required for installation can be reduced.

The rotors may also be provided with openings for vapor transmission, and uprising sections which are formed at the front edge of the openings in the rotational direction of the rotor, and lift the filmy test liquid. In this case, the vapor-liquid contacting efficiency can be further improved, and the effects described above can be further enhanced.

The rotor may be a disc, and a plurality of the aforementioned furrows may be formed at constant intervals in the circumferential direction on an upper surface of the disc, and inclined relative to a radial direction, so that those sections of the furrows closer to the outer periphery of the disc are positioned further forward in the rotational direction of the disc than those sections nearer the center of the disc.

The furrows are formed by evaginating a portion of a flat section of the rotor upwards, and the furrows may be curved so as to be concave towards the front in the rotational direction of the rotor. If the furrows are curved in this manner, the vapor-liquid contacting efficiency can be improved.

At least one stirring member, disposed near the outside of the rotor for stirring the test liquid discharged from the outer periphery of the rotor, may be provided in the contact column. In this case, the vapor-liquid contacting efficiency can be further improved, and the effects described above can be further enhanced.

Furthermore, according to a liquid deodorizing method and an aroma component liquid production method which use such a vapor-liquid contacting method, the aroma component recovery percentage and the odorous component removal efficiency from the test liquid can be improved, and consequently the production cost of aroma components or deodorized products can be reduced. Specifically, by addition to a food or beverage, the obtained aroma component liquid can contribute to the improvement of the dietary life of the consumer, as a highly aromatic fine food or beverage.

In addition, a food or beverage of the present invention contains an aroma component obtained by the aforementioned method.

BEST MODE FOR CARRYING OUT THE INVENTION

As follows is a description of preferred embodiments of the present invention with reference to the drawings. However, the present invention is not limited to the following embodiments, and may for example combine the structural elements of different embodiments as appropriate.

Figure 1:
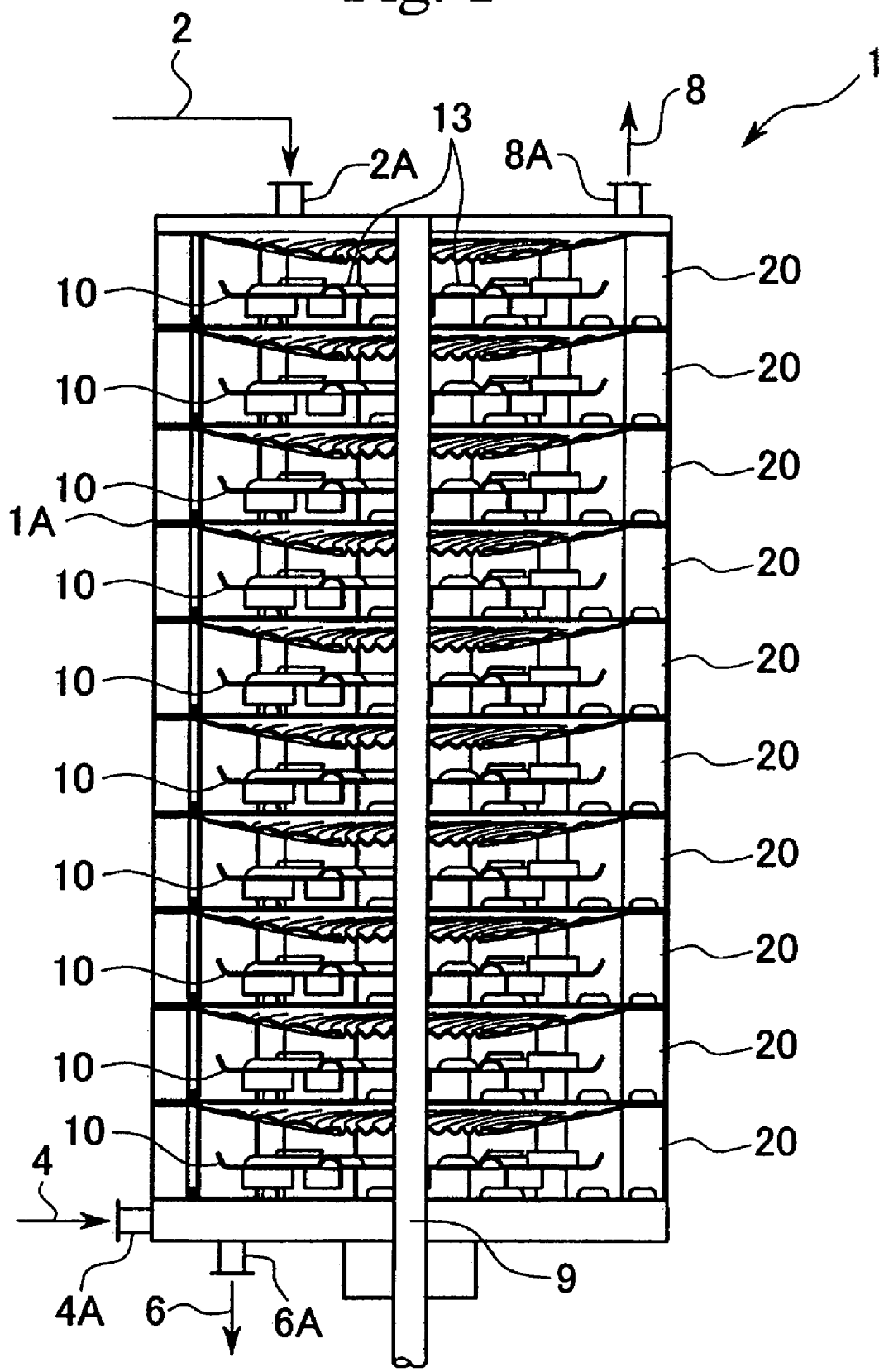
FIG. 1 is a side cross sectional view showing an example of a vapor-liquid contacting equipment of the present invention.

FIG. 1 is a diagram showing an embodiment of a vapor-liquid contacting equipment of the present invention. This vapor-liquid contacting equipment 1 comprises a contact column 1A in which an inlet 2A for a test liquid 2 and an outlet 8A for a vapor are provided at the top end thereof and an outlet 6A for a test liquid 6 and an inlet 4A for a vapor 4 are provided at the bottom end thereof, a rotary shaft 9 inserted in the contact column 1A, a plurality of rotors 10 which are provided at different heights on the rotary shaft 9, and which convert the test liquid into a thin film by centrifugal force and then discharge the test liquid from the outer periphery thereof, and a plurality of trays 20 which receive the test liquid discharged from an upper rotor and guide the test liquid to the center of a lower rotor. In this embodiment, the rotors 10 have furrows 13, which the test liquid flows over when the filmy test liquid flows out from the center of the rotor towards the outer periphery.

The contact column 1A is constructed from an airtight vessel, and the inlet 2A for the test liquid 2 and the outlet 8A for the vapor are provided at the top thereof, and the outlet 6A for the test liquid 6 and the inlet 4A for the vapor 4 are provided at the bottom thereof, and the test liquid 2 flows from the top of the contact column 1A to the bottom, and the vapor 4 flows from the bottom of the contact column 1A to the top, respectively, and counterflow contact of the vapor and the liquid occurs inside the contact column 1A. Although not shown in the diagram, a jacket for maintaining a constant internal temperature, and measuring instrument gauges such as sensors which measure the internal temperature and pressure are also mounted on this contact column 1A as required.

The inside of this contact column 1A can be controlled to either a condition under pressure by introducing vapor under pressure, or to a vacuum condition by suctioning the vapor outlet 8A. By adjusting the internal pressure in this manner it is possible to adjust the progress of evaporation. For example, when deodorizing a test liquid or recovering an aroma component, the pressure inside the contact column should be adjusted to a pressure at which the targeted component is volatized. When performing this type of processing, since it is necessary for the contact column to have a pressure withstanding structure capable of withstanding the operating pressure, the contact column is made from a pressure withstanding vessel. There are no restrictions on the shape of the contact column, but it is preferably a shape with a cylindrical body. Furthermore there are no specific restrictions on the construction material of the contact column, but in order to avoid a chemical reaction with the test liquid or vapor and obtain sufficient mechanical strength, the contact column is preferably constructed from a corrosion resistant metal material such as stainless steel or titanium alloy.

The rotors 10 are fixed at different heights to the rotary shaft 9 inserted vertically through the base of the contact column 1A, leaving a predetermined gap therebetween. There are no particular restrictions on the number of rotors 10. The rotary shaft 9 is rotation driven by a motor not shown in the diagram, which is external to the contact column 1A. It is desirable that a bearing structure which can maintain the air tightness within the contact column 1A is employed at the rotary shaft 9 insertion site on the bottom of the contact column 1A.

Figure 2:
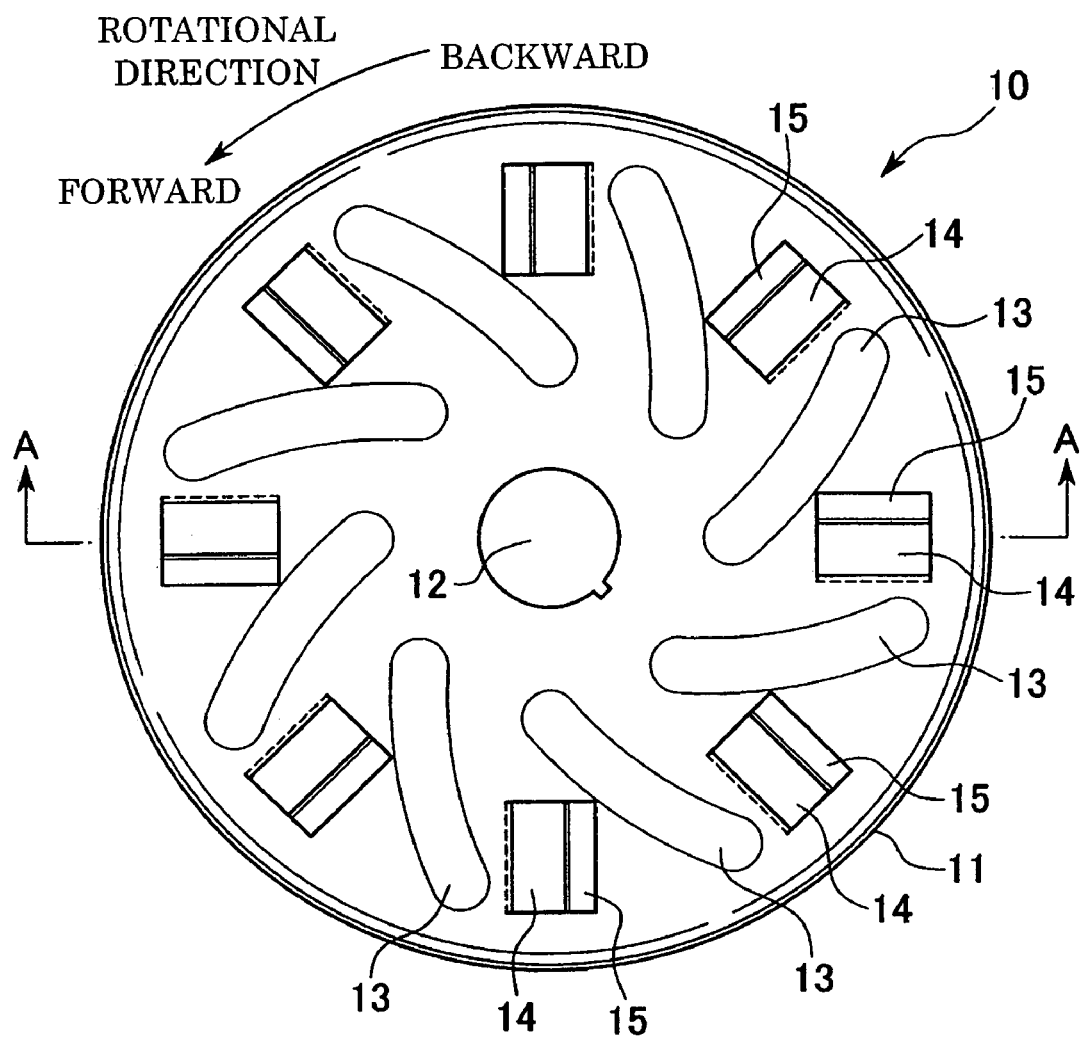
FIG. 2 is a plan view showing an example of a rotor suited to use in the present invention.
Figure 3:
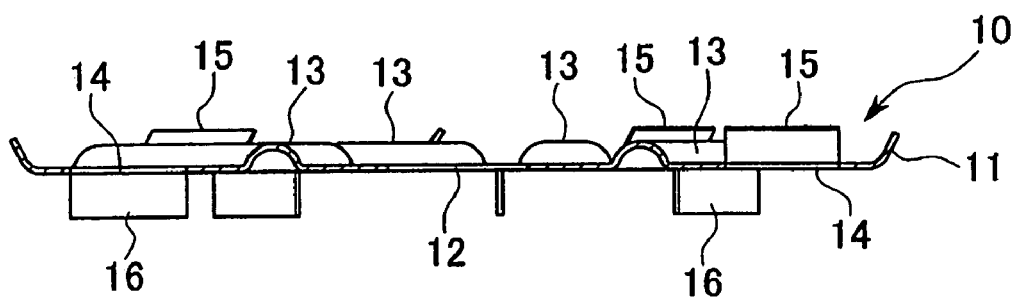
FIG. 3 is a cross sectional view along the line A—A in FIG. 2.
Figure 4:
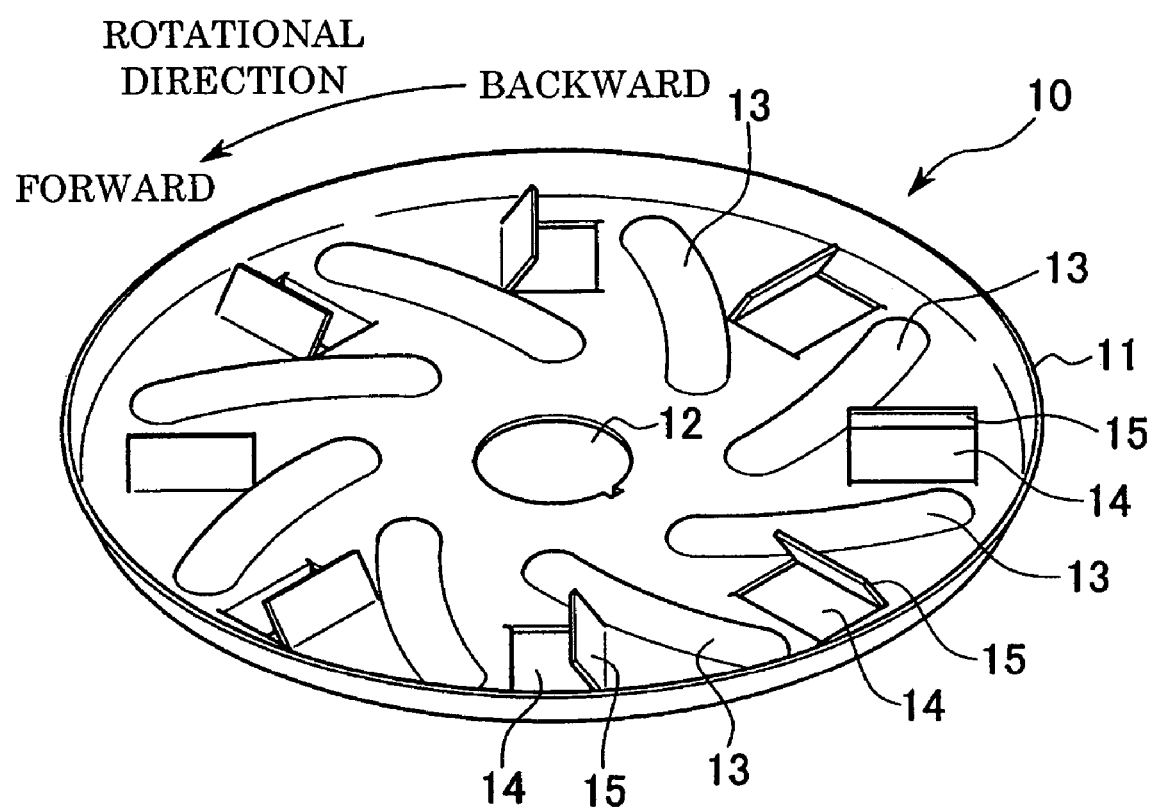
FIG. 4 is a perspective view of the rotor.

FIG. 2 through FIG. 4 are diagrams showing an example of a rotor suited to use in the present invention, wherein FIG. 2 is a plan view of the rotor, FIG. 3 is a cross sectional view along the line A—A in FIG. 2, and FIG. 4 is a perspective view. As shown in these diagrams, the rotor 10 is a disc shape on which a flange 11 which faces diagonally upwards is provided around the outer periphery of the disc, and a circular hole 12 with a key way for mounting and securing the disc to the rotary shaft 9 is provided in the center section of the disc. There are no particular restrictions on the construction material of the rotor 10, but in order to avoid a chemical reaction with the test liquid or vapor and obtain sufficient mechanical strength, the contact column is preferably constructed from a corrosion resistant metal material such as stainless steel or titanium alloy.

The rotor 10 is a disc, and by evaginating a portion of the surface section of the rotor upwards, a plurality of furrows (ridges) 13 are formed at equal intervals in the circumferential direction. Each respective furrow 13 is inclined relative to a radial direction, so that those sections of the furrows closer to the outer periphery of the disc are positioned further forward in the rotational direction of the disc than those sections nearer the center of the disc.

Although there may be only a single furrow, it is preferable that a plurality are formed with rotational symmetry since this yields a favorable rotational balance. The respective furrows 13 are curved so as to be concave towards the front in the rotational direction of the rotor 10. In other words, the furrows are formed so as to curve towards the front in the rotational direction of the rotor 10 as they approach the outer periphery of the rotor. However, the furrows in the present invention need not necessarily be a curved shape wherein the front in the rotational direction is concave, and may be straight, or may be curved in the opposite direction to the furrows 13. However, it is preferable for the furrows to be curved so as to be concave to the front in the rotational direction, since the liquid is more likely to flow substantially perpendicularly over the entire length of the furrow 13, which improves the vapor-liquid contacting efficiency.

There are no particular restrictions on the shape of the cross section of the furrow 13, provided that the filmy test liquid can pass over the furrow, and the shape can be a triangle, a semicircle, an arch, a normal distribution curve, or a trapezoid, although a semicircle or an arch is preferable.

The direction of the incline of these furrows 13 is opposite to the direction of impeller blades formed on the impellers or the like of common centrifugal pumps, for example. The impellers of centrifugal pumps are formed to radiate liquid towards the outer periphery of the rotor, but the furrows 13 in the present invention are for the test liquid to pass over, and not for promoting the radiation of the liquid to the outer periphery of the rotor.

By providing the furrows 13 described above on the rotors 10, when the rotor 10 is in a rotating state, the longitudinal direction of the furrow 13 is always at substantially a right angle relative to the direction of flow of the test liquid. In this manner, if the test liquid hits the furrow 13 at substantially a right angle and flows over the furrow in a direction orthogonal to the longitudinal direction of the furrow, then the vapor-liquid contacting efficiency is improved because the liquid is more easily agitated in the vertical direction.

In the rotor 10 of this embodiment, in addition to the furrows 13, openings 14 for vapor transmission are formed through the rotor 10, and uprising sections 15 are formed at the front edge of the openings 14 in the rotational direction, and lift up the filmy test liquid.

There are no particular restrictions on the shape and dimensions of the openings 14, or on the number of openings 14 formed, provided that the vapor can pass through the opening 14 from the lower side of the rotor 10 towards the upper side, but in order to prevent a bias in the vapor flow, it is desirable that at least four openings are formed at equal intervals around the circumferential direction of the rotor.

The vapor which passes through these openings 14 contacts the filmy test liquid on the upper surface of the rotor 10 with good efficiency.

Furthermore, it is particularly effective to form the uprising sections 15 at the front edge of the openings 14 in the rotational direction. In the present example, the uprising sections 15 are formed on the side of the opening 14 from which the test liquid flows (in other words, the forward direction in the rotational direction) and protrude diagonally upwards in a plate shape, inclined towards the reverse in the rotational direction. By forming the uprising sections 15 in this manner, when the test liquid flows out from the center of rotor 10 towards the outer periphery, the liquid film of the test liquid is lifted up by the uprising sections 15, jumps over the opening 14, and falls back onto the upper surface of the rotor 10. On the other hand, if the uprising sections 15 are not provided, the test liquid falls through the opening 14 to a lower level, and there is a danger that the vapor-liquid contacting efficiency will actually be reduced. By forming the uprising section 15 to the front of the opening 14 in the rotational direction, the filmy test liquid which reaches the uprising section 15 is lifted up, and instead of falling through the opening 14, jumps over the opening 14 and falls back onto the rotor 10. Because the liquid film lifted up by the uprising section 15 in this manner contacts the vapor which passes through the opening 14 with good efficiency, the vapor-liquid contacting efficiency can be further improved.

The opening 14 and the uprising section 15 can be formed, for example, by forming an H shaped cut at a predetermined location in the rotor 10, and then bending the front side of the cut in the rotational direction diagonally upwards from the central cut which links the parallel lines of the H shaped cut. In the example shown in FIG. 2 through FIG. 4, by forming the uprising section 15 by forming an H shaped cut in a predetermined location in the rotor 10, and then bending the front side of the cut in the rotational direction diagonally upwards along the central cut which links the parallel lines of the H shaped cut, and bending the opposing side downward, a stirring impeller 16 is formed, and the opening left after bending these pieces functions as the opening 14. The stirring impeller 16 formed protruding from the lower surface of the rotor 10 has effects such as increasing the volume of the vapor which flows into the opening 14. However, the shapes of the opening 14, the uprising section 15 and the stirring impeller 16 are not limited to those shown in the diagrams, and the shapes may be altered appropriately.

In the contact column 1A, trays 20 are fixed to locations between each pair of upper and lower rotors 10 which are distributed at different heights. These trays 20 are for receiving the test liquid discharged from the upper rotor 10 and guiding the test liquid to the lower rotor 10, and there are no particular restrictions on the shape and dimensions of the trays provided that this function can be achieved. Furthermore, there are no particular restrictions on the construction material of these trays 20, but in order to avoid a chemical reaction with the test liquid or vapor, the trays 20 are preferably constructed from a corrosion resistant metal material such as stainless steel or titanium alloy.

Figure 5:
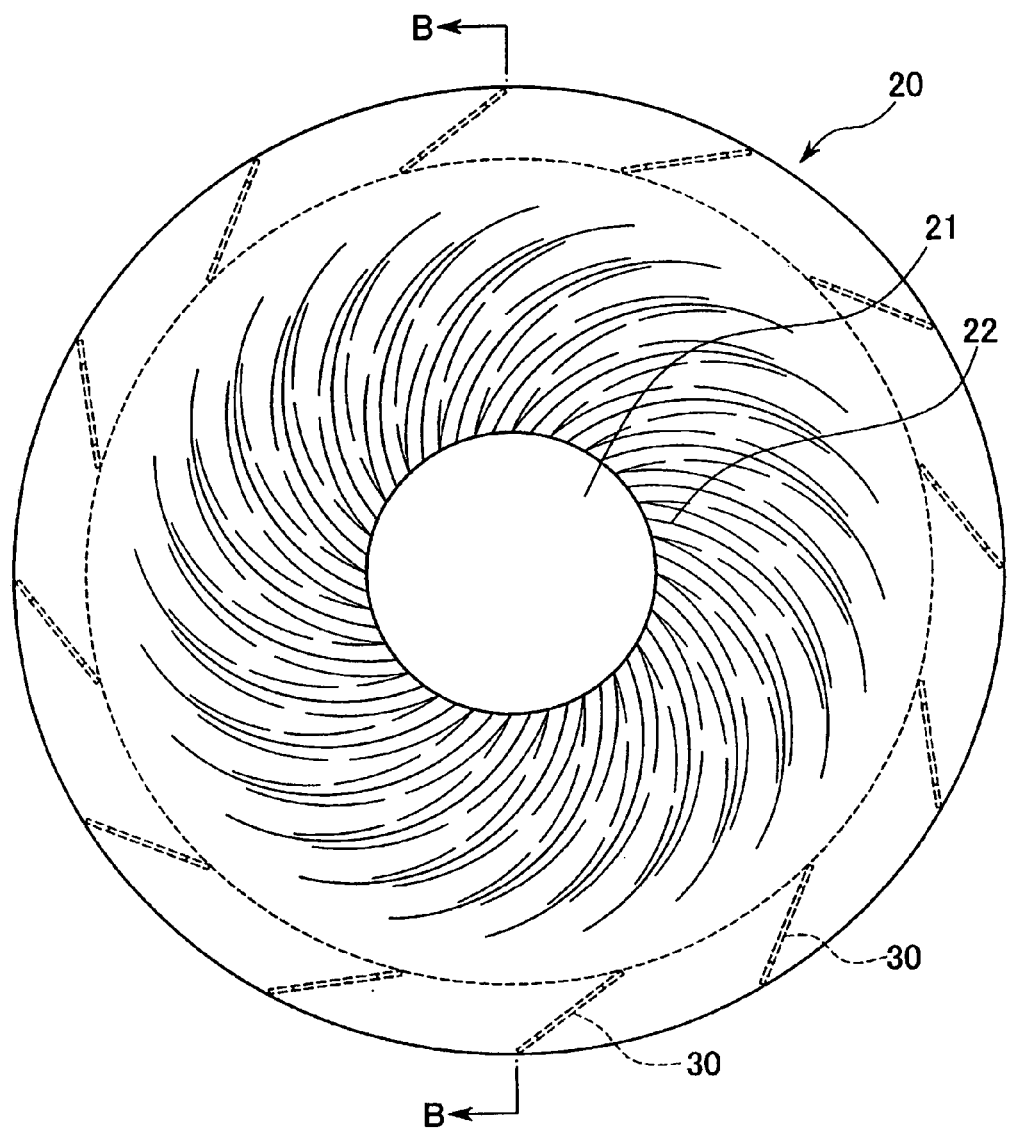
FIG. 5 is a plan view of the rotor showing an example of a tray which is suited to use in the present invention.
Figure 6:
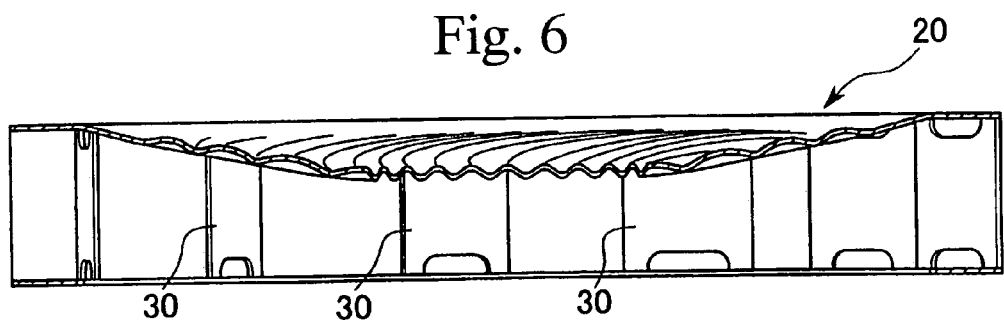
FIG. 6 is a cross sectional view along the line B—B in FIG. 5.
Figure 7:
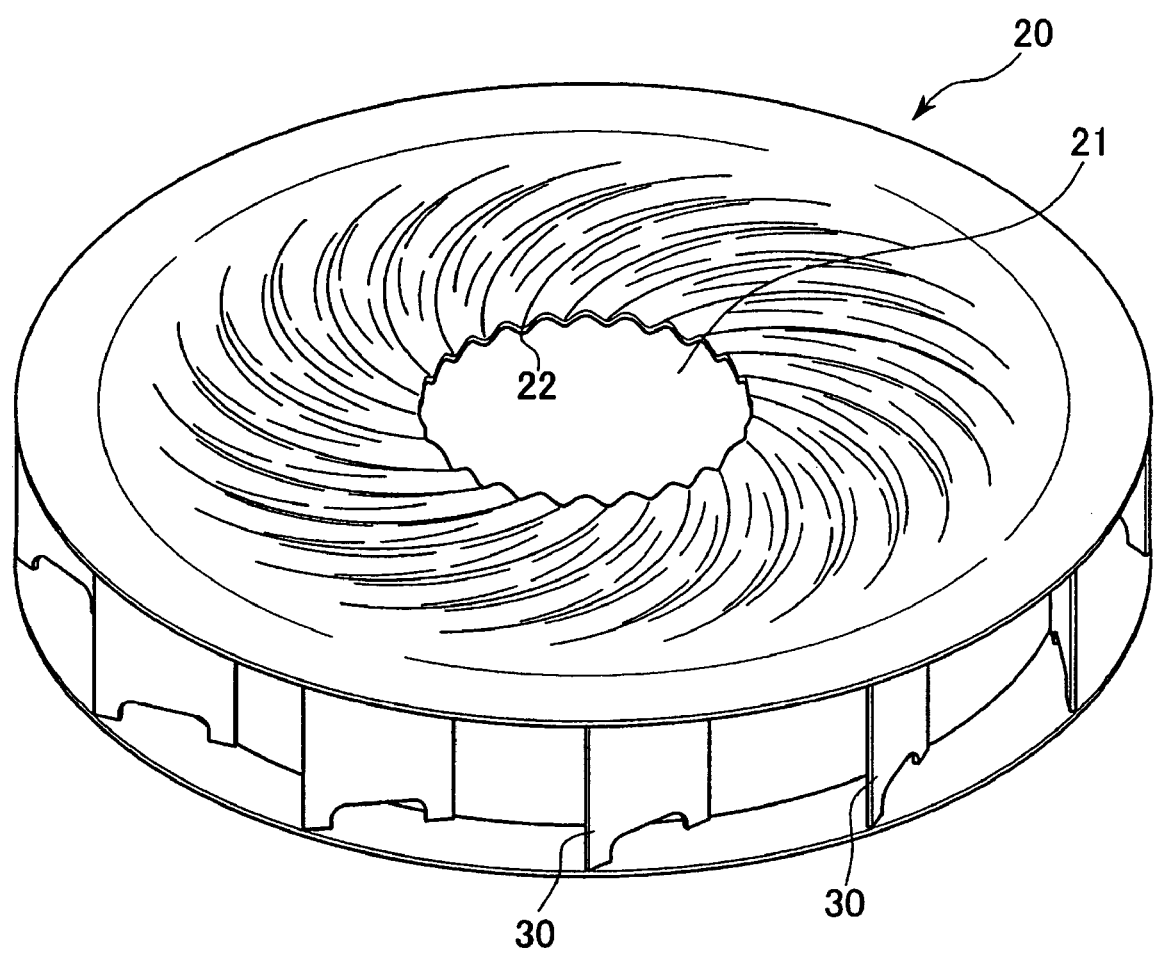
FIG. 7 is a perspective view of the tray.

FIG. 5 through FIG. 7 show an example of a tray which is suitable for use in the present invention, wherein FIG. 5 is a plan view of the tray 20, FIG. 6 is a cross sectional view along the line B—B in FIG. 5, and FIG. 7 is a perspective view of the tray 20.

The tray according to this example is fixed to the inside of the contact column 1A, and is a circular disc shape with a flowing hole 21 through which the rotary shaft 9 can pass and which allows the test liquid collected on the upper surface to fall to a lower rotor 10 provided in the center of the disc. The diameter of this flowing hole 21 is larger than that of the rotary shaft 9 inserted through the center of the hole, so that the flowing hole 21 can also function as a pathway for the vapor. The upper surface of this tray 20 gently falls from the outer periphery towards the flowing hole 21, and a plurality of flow grooves 22 are formed in a spiral pattern leading towards the flowing hole 21. The outer periphery of the tray 20 is preferably bonded tightly to the inner wall surface of the contact column 1A so that liquid does not leak along the inner wall surface.

In this embodiment, at least one stirring member 30 is fixed integrally to the lower surface of the tray 20, near the outside of the rotor 10, and these stirring members 30 agitate the test liquid discharged from outer periphery of the rotor 10. As shown in FIG. 6 and FIG. 7, the stirring members 30 are in the form of flat upright plates, and a plurality of such plates are arranged in an upright state at equal intervals around the outer periphery of the rotor 10. These stirring members 30 collide with and agitate the test liquid, when the test liquid is discharged from the outer periphery of the rotor 10 by the centrifugal force of the rotor 10. By this agitation, the test liquid is mixed and stirred with the surrounding vapor, further promoting the vapor-liquid contacting efficiency. The shape of the stirring members 30 is not restricted to the shape used in this example, and may also be a curved surface, or a shape in which fins or through holes are provided.

Next, a vapor-liquid contacting method of the present invention is described.

Any test liquid can be processed using this vapor-liquid contacting method provided that it is in liquid form. For example, a variety of aqueous solutions, nonaqueous solvent solutions, leaching solutions of alcohol, suspensions, emulsions and the like can be used. Furthermore, there are also no particular restrictions on the vapor which is contacted with this test liquid, and the necessary vapor element can be provided alone, or as a mixture with another gas (for example an inactive carrier gas) according to the object of the treatment of the test liquid, such as an element transfer which is not accompanied by a chemical reaction between the test liquid and the vapor, or a reaction between an element in the test liquid and an element in the vapor, such as an oxidation, reduction, decomposition, condensation, polymerism, desorption, or addition reaction or the like.

As an example of the vapor-liquid contacting method of the present invention, an example is described in which the method of the present invention is applied to an element transfer which is not accompanied by a chemical reaction between the test liquid and the vapor, in other words a liquid deodorizing process or a method of producing an aroma component from a liquid, and is executed using the vapor-liquid contacting equipment 1 shown in FIG. 1. In this example, the test liquid is an aqueous solution, and the vapor is a vapor which contains steam, in other words a vapor selected from solely steam, a mixed vapor of steam and air, or a mixed vapor of steam and nitrogen, or the like.

The test liquid is supplied to the liquid inlet 2A provided at the top of the contact column 1A, after performing any appropriate preprocessing such as pH adjustment or disinfection, if required. On the other hand, the vapor is introduced from the vapor inlet 4A provided at the bottom of the contact column 1A. The pressure and the temperature in the contact column 1A are constantly monitored by measuring instruments such as sensors which are not shown in the diagram, and the contact column insulation jacket, the supply rate of the introduced vapor, and the driving of the vacuum pump which is connected to the vapor outlet are controlled so that the temperature and pressure in the contact column 1A are maintained at the desired levels. A structure can also be employed in which the control of the temperature and pressure, the adjustment of the supply rate of the test liquid, and the revolutions of the motor, which performs rotational drive of the rotor 10, are controlled automatically according to a preset program. The speed of rotation of the rotor 10 is set appropriately according to the viscosity of the test liquid and the amount to be processed, so that the centrifugal force is sufficient to make the test liquid filmy. Furthermore the test liquid can be supplied continuously or by the intermittent supply of constant amounts.

The test liquid supplied to the center of the upper surface of the uppermost rotor 10 spreads out quickly as a thin film on the surface of the rotor 10 due to the centrifugal force produced by the rotation of the rotor 10 and the adhesion to the upper surface of the rotor 10, and flows from the center towards the outer periphery. During this movement, the thin film of test liquid flows over the furrows 13 provided in the rotor 10.

By passing over the furrows 13, the movement distance of the thin film of the test liquid increases in comparison with a case in which the test liquid moves over a simple flat surface. Furthermore, when moving over the furrow 13, the thin film of the test liquid is spread even more thinly. Accordingly, by flowing over the furrow 13, the contacting efficiency of the thin film of the test liquid with the ambient vapor in the surrounding environment is considerably improved in comparison with the case of a flat surface. In addition, by forming the furrows in the present invention in a curved shape, the test liquid strikes the furrow 13 at substantially a right angle, and passes over the furrow 13 in a direction orthogonal to the longitudinal direction of the furrow 13, and consequently the liquid tends to be agitated in a vertical direction, enabling the vapor-liquid contacting efficiency to be further improved.

The test liquid which flows over the furrow 13 reaches the uprising section 15 provided at the front edge of the opening 14 in the rotational direction while still in the form of a thin film. The test liquid increases in film pressure, or forms a droplet, and climbs the surface of the uprising section 15 and is discharged from the tip thereof and flies over the opening 14, before falling back onto the outer peripheral portion of the rotor 10. Vapor flows through from beneath the opening 14. Accordingly, when the test liquid flies from the uprising section 15 over the opening 14, the test liquid is mixed with the vapor blown up through the opening 14, and consequently even at this point the contact between the vapor and the liquid is adequate.

The test liquid which has flown over the opening 14 flows towards the outer periphery of the rotor 10, and is discharged from the flange 11 which faces diagonally upwards. The test liquid discharged from the rotor 10 falls onto the upper surface of the tray 20 provided between the uppermost rotor 10 and the rotor 10 immediately below. The test liquid which falls onto the tray 20 flows along the flow grooves 22 towards the center, and flows down through the flowing hole 21 formed in the center of the tray 20. The test liquid which flows down through the flowing hole 21 falls onto the upper surface of the lower rotor 10, and in this rotor 10, the same vapor-liquid contact process described above is repeated.

As described above, while flowing down over the rotors 10 provided at different heights from top to bottom, the test liquid is well contacted with the vapor, and after the element transfer between the vapor and the liquid has been performed, the test liquid is removed from the device through the liquid outlet 6A provided at the bottom of the contact column 1A. In contrast, the vapor, which by contacting the test liquid has taken in at least one element from the test liquid, is discharged from the vapor outlet 8A provided at the top of the contact column 1A.

According to the vapor-liquid contacting method of the present invention, by performing vapor-liquid contacting using the rotors 10 in which furrows 13 which the filmy test liquid flows over are provided, the vapor-liquid contacting efficiency is increased, continuous operation over extended periods is possible, and the investment cost and the running costs can be reduced.

In addition, by employing rotors 10 with the openings 14 formed through the rotors 10 through which enable vapor to pass through, and the uprising sections 15 which are formed at the front edge of the openings 14 in the rotational direction and which lift the filmy test liquid, the effects described above can be further enhanced.

In addition, by providing in the contact column 1A near the outside of the rotor 10, at least one stirring member 30 which agitates the test liquid discharged from the outer periphery of the rotor 10, the effects described above can be further enhanced.

The present invention also provides a liquid deodorizing method and an aroma component production method using the vapor-liquid contacting method described above, as well as a food or beverage containing an aroma component produced by the aroma component production method.

In a liquid deodorizing process of the present invention, a liquid which has an intrinsic objectionable odor is used as the test liquid, and the odor in the liquid is removed by contacting the test liquid with vapor using the vapor-liquid contacting method of the present invention, thereby deodorizing the test liquid. Such a deodorizing method is suitable for use in deodorizing aqueous solutions of whey protein concentrate (WPC), whey protein isolate (WPI), or milk protein concentrate (MPC), as well as skim milk, cream raw milk, aqueous solutions of casein, and aqueous solutions of peptide or the like, as well as being applicable to the whey liquid exemplified in the example below, and yields a product with hardly any objectionable odor. The vapor used in this deodorizing method is preferably a vapor containing steam, in other words a vapor selected from solely steam, a mixed vapor of steam and air, or a mixed vapor of steam and nitrogen, or the like.

Furthermore, in the aroma component production method, a suitable test liquid is one with a desirable aroma, and specifically, it is most preferable for the test liquid to be a plant extract. A plant extract is a liquid extracted from plant tissue components such as the seeds, leaves, roots or stem of the plant. Suitable examples of such plant extracts include coffee, tea, green tea, oolong tea, and other types of tea, or cocoa, coconut milk, herbs, orange, apple, grapefruit and lemon and the like. In this method, the test liquid which contains the aroma component is supplied from the top of the contact column 1A, and a vapor containing steam, in other words a vapor selected from solely steam, a mixed vapor of steam and air, or a mixed vapor of steam and nitrogen, or the like, is introduced from the bottom of the contact column 1A, and vapor-liquid contact is performed within the contact column 1A. The aroma component in the test liquid is transferred to the vapor, and is removed through the vapor outlet provided at the top of the contact column 1A. By then cooling the removed vapor and condensing the steam, a liquid containing the aroma component is obtained. Alternatively, the removed vapor can be directed into alcohol or an organic solvent, to create an alcohol liquid or a nonaqueous solution in which the aroma component is dissolved. This liquid containing the aroma component, the alcohol liquid or the nonaqueous solution can be added directly as an aroma component raw material to a variety of products, particularly foods or beverages, and the aroma component can also be used in condensed form.

According to this aroma component production method, it is possible to obtain the aroma component efficiently, and obtain a condensate which contains a larger amount of the aroma component than that obtainable with conventional methods under the same conditions. Specifically, by addition to a food or beverage, the obtained aroma component liquid can contribute to the improvement of the dietary life of the consumer, as a highly aromatic fine food or beverage.

Next, the present invention is described in more detail using a series of examples, although the present invention is in no way limited to the examples presented below.

EXAMPLES

Example 1

A vapor-liquid contacting equipment 1 having the construction shown in FIG. 1 was prepared. A circular cylindrical airtight column was used as a contact column 1A, and a rotary shaft 9 was provided inside the column. A jacket, which is not shown in the diagram, was mounted on the external wall of this contact column 1A, enabling the internal temperature to be controlled. The rotary shaft 9 was inserted vertically through the bottom of the contact column 1A, and linked to the motor via a pulley which is not shown in the diagram. An inlet 2A for a test liquid 2 and an outlet 8A for a vapor were provided at the top of the contact column 1A. Furthermore, an outlet 6A for a processed test liquid 6 and an inlet 4A for a vapor 4 were provided at the bottom of the contact column 1A.

Rotors 10 in the form of the circular disc shown in FIG. 2 through FIG. 4 were fixed to the rotary shaft 9 at different heights. Trays 20 having the shape shown in FIG. 5 through FIG. 7 were provided between each pair of upper and lower rotors 10 and were fixed to the inner wall of the contact column 1A. 21 pairs comprising a rotor 10 and a tray 20 were provided within the contact column 1A.

Each rotor 10 was manufactured from stainless steel with a thickness of 1.2 mm, and was formed into a circular disc with a diameter of approximately 160 mm. A diagonally upwards facing flange 11 of width 5 mm was formed at the outer periphery of each rotor 10, a circular hole 12 with a diameter of approximately 25 mm was provided in the center, and eight furrows 13 and eight sets each comprising an opening 14, an uprising section 15 and a stirring impeller 16 were also provided on the rotor. The furrows 13 were formed by evaginating upwards a portion of the flat surface of the rotor 10 to form an arched cross section with a width of approximately 10 mm and a length of approximately 50 mm. Eight furrows 13 were formed at equal intervals around the circumferential direction of the rotor 10, and as shown in FIG. 2, the furrows are a curved shape, so that those sections of the furrows closer to the outer periphery of the rotor are positioned further forward in the rotational direction of the rotor than those sections nearer the center.

Each set comprising an opening 14, an uprising section 15 and a stirring impeller 16 was formed by producing an H shaped cut comprising two parallel cuts each approximately 16 mm in length, one at a position near the outer periphery of the rotor and the other at a position closer to the center of the rotor by 20 mm, and a cut which connects these two cuts, and then forming the uprising section 15 by lifting up the piece to the front in the rotational direction so that it faces diagonally upwards, and bending the other piece downwards to form the stirring impeller 16, leaving the square hole opened by the bending of these pieces as the opening 14.

Furthermore, each tray 20 was manufactured from stainless steel with a thickness of 1.2 mm, and was formed in a circular thin-dish shape in which the center is lower than the outer periphery. The diameter of this tray 20 is larger than that of the rotor 10, and a flowing hole 21 with a diameter of approximately 60 mm was provided in the center thereof, and a plurality of flow grooves 22 were formed in a spiral shape on the upper surface of the tray.

Twelve plate shaped stirring members 30 with a width of approximately 30 mm and a height of approximately 32 mm were each joined to the lower surface of the tray 20 at a predetermined angle relative to the circumference. The lower surfaces of each stirring member 30 was then joined to a reinforcing ring.

A storage tank for the test liquid prior to processing, a storage tank for the test liquid following completion of processing, a vapor (steam or a mixed vapor of steam and air) supply device, a first and a second cooling condenser (condensing device) for condensing the processed vapor, a vapor-liquid separator, and a vacuum pump were connected to the vapor-liquid contacting equipment 1 constructed in the manner described above, thereby forming a device which, by contacting the test liquid with steam or a mixed vapor of steam and air, is suitable for deodorizing a test liquid which contains an odor component, or for producing an aroma component liquid by condensing the aroma component in a test liquid which contains an aroma component.

The effects of this device are as follows.

The test liquid 2 is supplied from the storage tank onto the upper surface of the uppermost rotor 10 via the test liquid inlet 2A in the contact column 1A. The rotors 10 are rotated at a predetermined rotational speed, and the flowing test liquid is converted into a thin film by centrifugal force. The filmy test liquid is discharged from the outer periphery of the rotor 10 by centrifugal force, and caught by the tray 20 fixed beneath the rotor 10. Subsequently, the test liquid moves along the flow grooves 22 and flows down through the flowing hole 21 formed in the center of the tray 20, and falls onto the lower rotor 10. The same process is repeated sequentially until the test liquid finally reaches the bottom of the contact column 1A, where it is discharged from the test liquid outlet 6A, and stored in the processed test liquid storage tank.

On the other hand, steam (the vapor 4), which is diluted as appropriate by mixing with air, is introduced from the vapor inlet 4A. The reason for diluting the steam with air is that in those cases in which the steam is prone to condensing within the contact column 1A, this condensation can be prevented by reducing the partial pressure of the steam. In this case, in order to improve energy efficiency, the air may be heated to produce a hot blast of air. The steam is introduced from an inlet formed at the bottom of the contact column, and rises up through the column while contacting the test liquid which is flowing downwards, and is then discharged from the outlet 8A at the top of the contact column.

The vapor 8 which contains the discharged steam is condensed in the first and the second cooling condenser, thereby enabling recovery of a condensate. Subsequently, the remaining vapor is suctioned by the vacuum pump through the vapor-liquid separator, and the interior of the contact column 1A is controlled to a predetermined negative pressure by this vacuum pump.

Example 2

The vapor-liquid contacting method of the present invention was performed using the vapor-liquid contacting equipment prepared in the example 1 above. In this example 2, coffee was employed as the test liquid. In other words, coffee beans known as "washed mocha" (made by Unicoffee Co. Ltd.) were ground in a coffee mill (model R-400 made by Toshiba Corporation) and 16.0 kg of an extract was obtained by extracting ground coffee beans equivalent to 10% by weight of the extract in hot water at 93° C.

Using the vapor-liquid contacting equipment from the example 1, 8.0 kg of the prepared coffee extracted liquid was supplied to the supply column at a temperature of 25° C. and a supply rate of 30 L/H.

The rotational speed of the rotors was set to 3 $s^{-1}$ (180 rpm), the steam and a 110° C. hot air blast were blown in from the bottom of the contact column at rates of 3.4 kg/H and 1.4 $m^3$/H respectively, and under vacuum pressure of −60 kPa, the aroma component in the coffee extracted liquid was transferred to the steam, and then condensed in the first and the second cooling condensers, yielding 500 g of an aroma component liquid.

The obtained aroma component liquid provided a very fresh, strong coffee flavor. In addition, the results of analyzing the aromas of the headspaces of the coffee extracted liquid and the liquid remaining after the aroma component was recovered, using a solid phase microextraction gas chromatograph mass spectrometer (GC-MS), are shown in FIG. 8.

Figure 8:
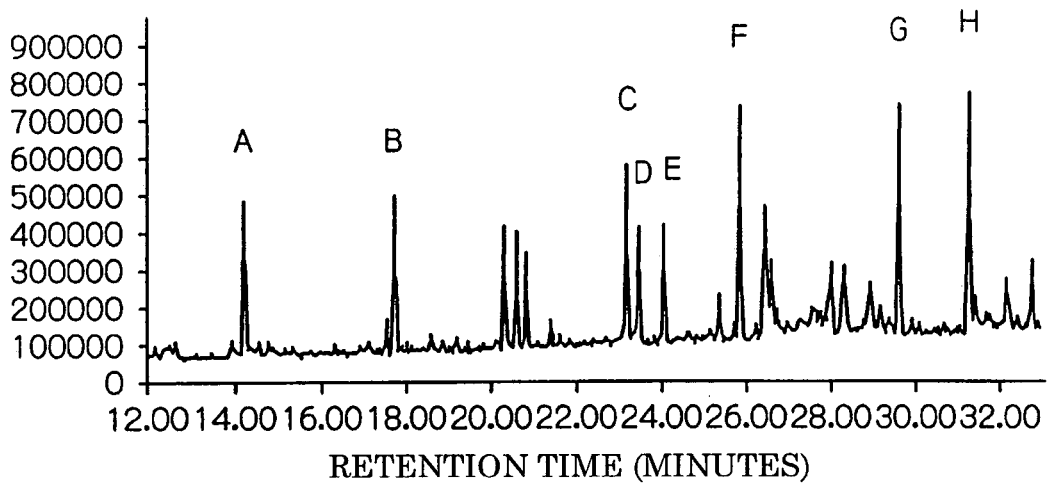
FIG. 8 shows chromatography results of element transfer measurements before and after processing of a coffee extracted liquid in an example 2 of the present invention.
Figure 8:
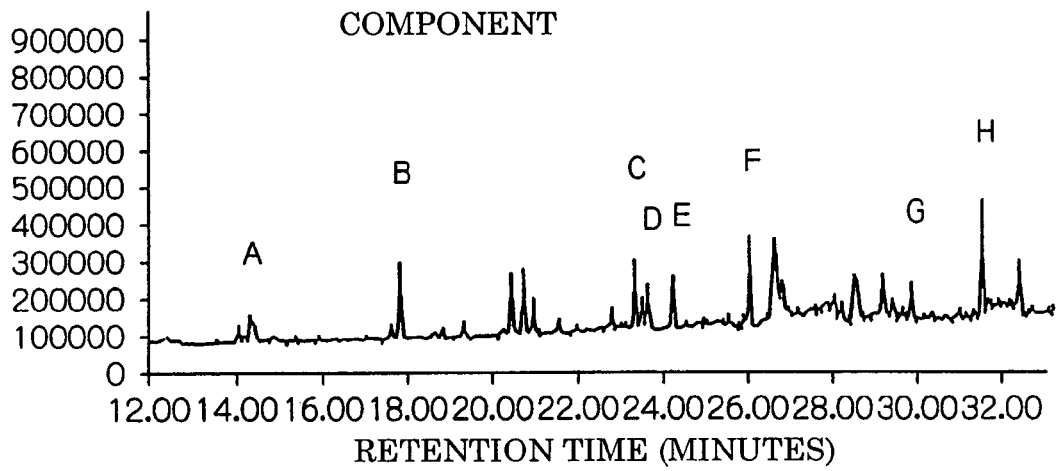

For example, the substance F (2,5-dimethyl 3-ethylpyrazine) in FIG. 8 is a typical aroma component of coffee, and was determined to have been recovered at a recovery percentage of 85%. Using conventional technology, over the same vapor-liquid contact time as this example (20 seconds), the recovery percentage was approximately 60 to 70%. The conditions of analysis were as follows.

1. Measuring Equipment

| | | |
|---|---|---|
| GC: | Made by Agilent Technologies Ltd., model 6890 | |
| MS: | Made by Agilent Technologies Ltd., model 5973 | |
| Column: | Innowax (Product name, made by Agilent Technologies Ltd.) | |
| | (Bridged polyethylene glycol) | |
| | Film Thickness: 0.5 μm | |
| | Length: 30 m | |
| | Bore: 0.25 mm | |
| SPME Fiber: | Made by Supelco | |

2. Aroma Component Separation and Concentration Methods.

Solid phase microextraction (SPME): 40° C., 30 minutes, Head space method

3. Measurement Conditions

| | | |
|---|---|---|
| GC | Inlet temperature: | 265° C. |
| | Gas flow rate: | 1.2 ml/minute helium gas |
| | Oven temperature conditions: | 40° C., 2 minutes |
| | | 4° C./minute (to 120° C.) |
| | | 6° C./minute (to 240° C.), maintain for 10 minutes |
| MS | Measurement mode: | SCAN |
| | | 3 SCAN/second |

Example 3

Next, an example of a deodorizing method of the present invention using the vapor-liquid contacting equipment of the example 1 is described.

800 g of whey powder (a product of Milei GMHB of Germany) was dissolved in water of temperature 60° C. using a homomixer (a product of Tokushu Kika Kogyo Co., Ltd.), to prepare 8.0 kg of an aqueous solution of whey. The prepared aqueous solution of whey was supplied to the vapor-liquid contacting equipment of the example 1, at a temperature of 50° C. and a supply rate of 40 L/H.

The rotational speed of the rotor was set to 5 $s^{-1}$ (300 rpm), steam and a 120° C. hot blast of air were blown in from the bottom of the contact column at rates of 5.2 kg/H and 1.4 $m^3$/H respectively, and under vacuum pressure of −70 kPa, the bad odor component of the aqueous solution of whey was transferred to the steam, and then condensed in the first and the second cooling condensers, yielding 750 g of a bad odor component liquid.

Upon checking the flavor of the aqueous solution of whey which had undergone the process described above, it was confirmed that the distasteful odor of the whey had been almost entirely eliminated, resulting in an excellent aqueous solution of whey. In addition, the results of analyzing the aqueous solution of whey and the deodorized liquid thereof using the same methods as in the example 2 are shown in FIG. 9.

Figure 9:
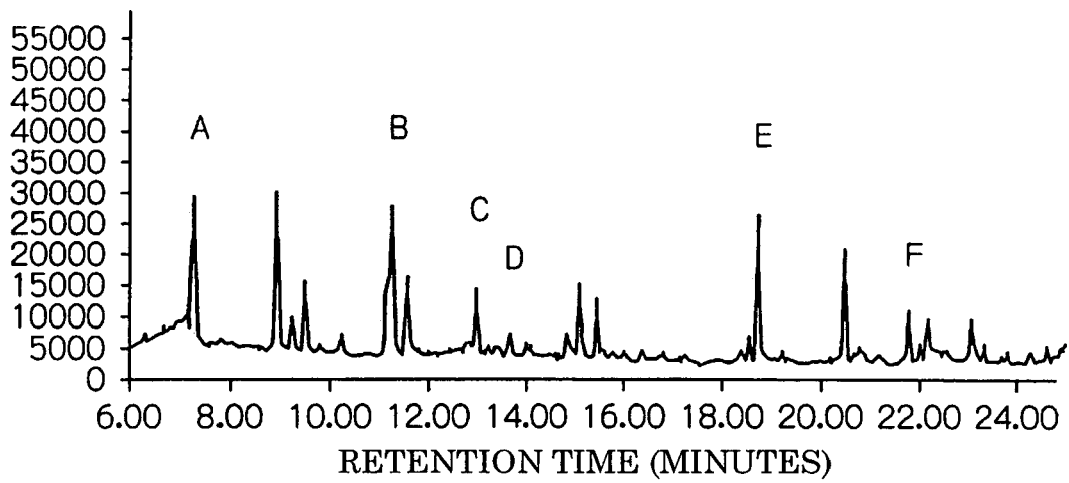
FIG. 9 shows chromatography results of element transfer measurements before and after processing of an aqueous solution of whey in an example 3 of the present invention.
Figure 9:
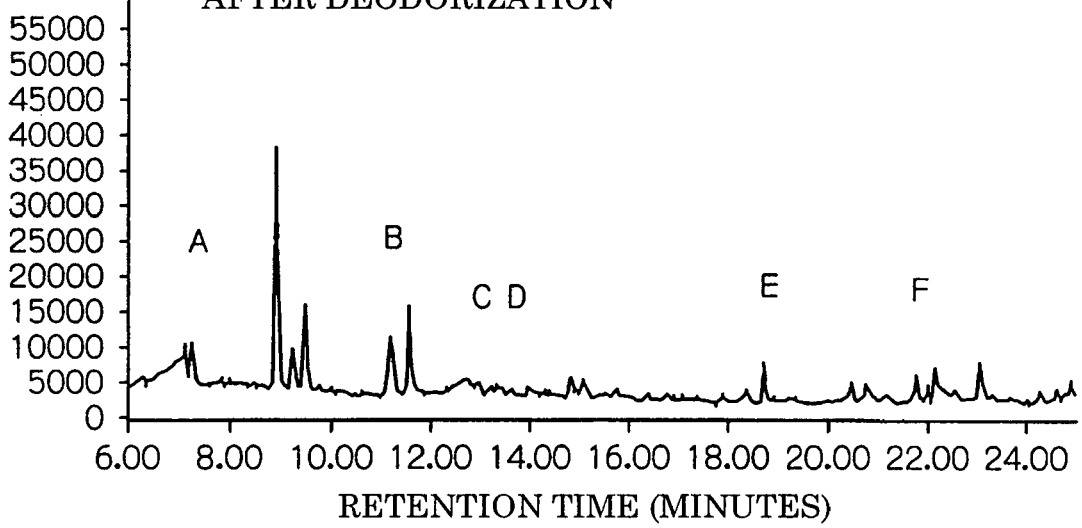

For example, the substance A in FIG. 9 (hexanal) is a typical bad odor component of whey, and was determined to have been removed with a rejection ratio of 95%. Using conventional technology, over the same vapor-liquid contacting time as this example (20 seconds), the rejection ratio was approximately 60 to 70%.

Example 4

Next, an example of a deodorizing method of the present invention using the vapor-liquid contacting equipment of the example 1 is described.

400 g of skim milk powder condensed by UF filter (a product of Milei GMHB of Germany) was dissolved in water of temperature 60° C. using a homomixer (a product of Tokushu Kika Kogyo Co., Ltd.), to prepare 8.0 kg of an aqueous solution of skim milk powder condensed by UF filter.

The prepared aqueous solution of skim milk powder condensed by UF filter was supplied to the vapor-liquid contacting equipment of the example 1, at a temperature of 50° C. and a supply rate of 35 L/H.

The rotational speed of the rotor was set to 4 $s^{-1}$ (240 rpm), steam and a hot blast of air were blown in from the bottom of the contact column at rates of 4.3 kg/H and 1.1 $m^3$/H respectively, and under vacuum pressure of −65 kPa, the bad odor component of the aqueous solution of skim milk powder condensed by UF filter was transferred to the steam, and then condensed in the first and the second cooling condensers, yielding 850 g of a bad odor component liquid.

Upon checking the flavor of the aqueous solution of skim milk powder condensed by UF filter which had undergone the process described above, it was confirmed that the distasteful odor of the skim milk powder condensed by UF filter had been almost entirely eliminated, resulting in an excellent aqueous solution of skim milk powder condensed by UF filter. In addition, the results of analyzing the aqueous solution of skim milk powder condensed by UF filter and the deodorized liquid thereof using the same methods as in the example 2 are shown in FIG. 10.

Figure 10:
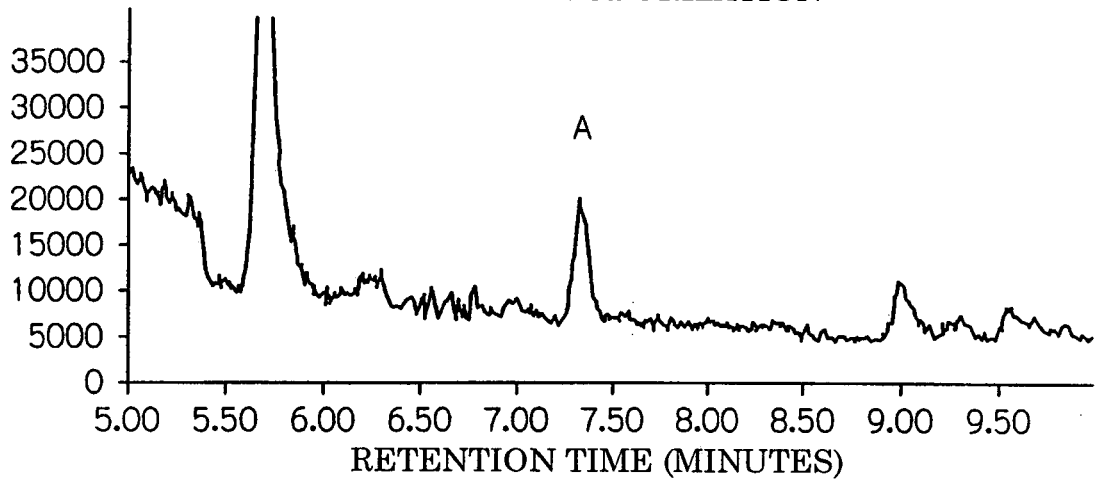
FIG. 10 shows chromatography results of element transfer measurements before and after processing of an aqueous solution of skim milk powder condensed by UF filter in an example 4 of the present invention.
Figure 10:
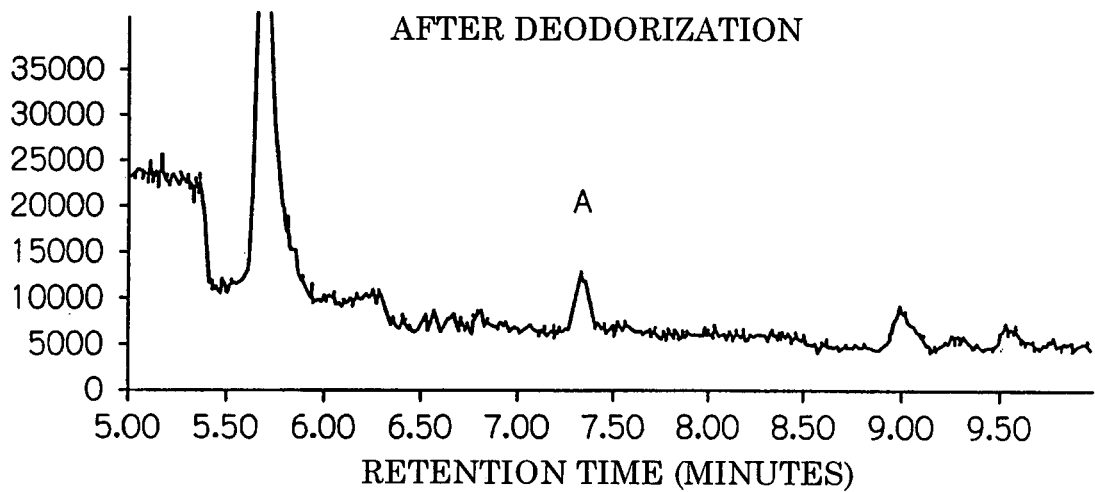

For example, the substance A in FIG. 10 (undecane) is a typical bad odor component of condensed skim milk powder, and was determined to have been removed with a rejection ratio of 81%. Using conventional technology, over the same vapor-liquid contacting time as this example (20 seconds), the rejection ratio was approximately 60 to 70%.

Example 5

Next, an example of a deodorizing method of the present invention using the vapor-liquid contacting equipment of the example 1 is described.

8.0 kg of skim milk (a product of Morinaga Milk Industry Co. Ltd.) was supplied to the vapor-liquid contacting equipment of the example 1, at a temperature of 40° C. and a supply rate of 70 L/H.

The rotational speed of the rotor was set to 5 $s^{-1}$ (300 rpm), steam and a hot blast of air were blown in from the bottom of the contact column at rates of 5.2 kg/H and 1.4 $m^3$/H respectively, and under vacuum pressure of −65 kPa, the bad odor component of the skim milk powder was transferred to the steam, and then condensed in the first and the second cooling condensers, yielding 810 g of a bad odor component liquid.

Upon checking the flavor of the skim milk powder which had undergone the process described above, it was confirmed that the distasteful odor of the skim milk powder had been almost entirely eliminated, resulting in an excellent skim milk powder. In addition, the results of analyzing the skim milk powder and the deodorized liquid thereof using the same methods as in the example 2 are shown in FIG. 11.

Figure 11:
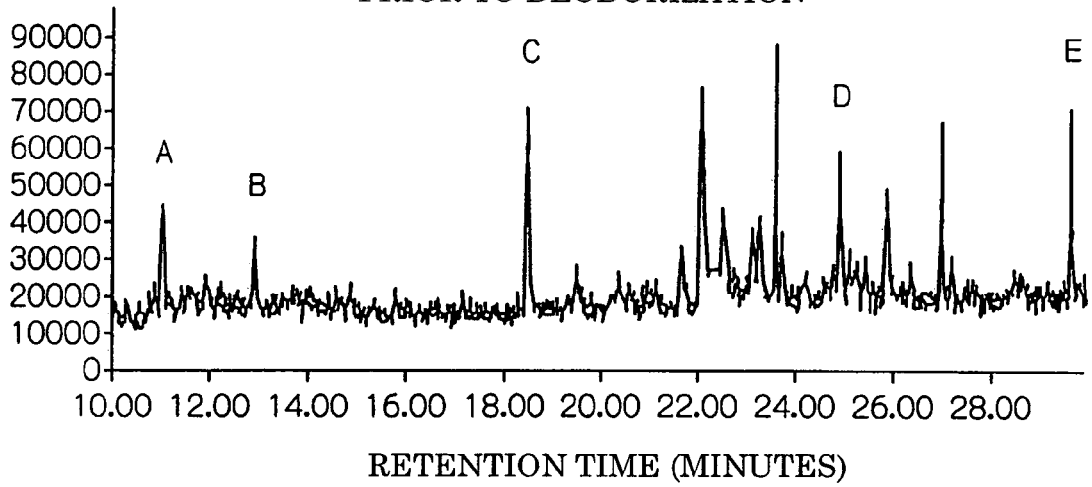
FIG. 11 shows chromatography results of element transfer measurements before and after processing of skim milk in an example 5 of the present invention.
Figure 11:
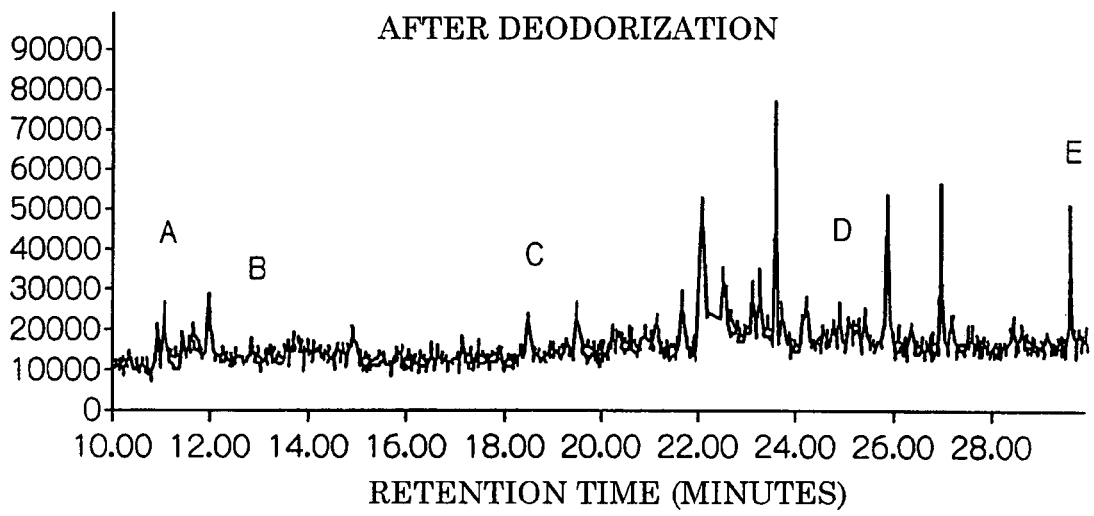

For example, the substance D in FIG. 11 (2-undecanone) is a typical bad odor component of skim milk powder, and was determined to have been removed with a rejection ratio of 97%. Using conventional technology, over the same vapor-liquid contacting time as this example (20 seconds), the rejection ratio was approximately 60 to 70%.

Example 6

Next, an example of a deodorizing method of the present invention using the vapor-liquid contacting equipment of the example 1 is described.

8.0 kg of soy milk (a product of Morinaga Milk Industry Co. Ltd.) was supplied to the vapor-liquid contacting equipment of the example 1, at a temperature of 55° C. and a supply rate of 50 L/H.

The rotational speed of the rotor was set to 4 $s^{-1}$ (240 rpm), steam and a hot blast of air were blown in from the bottom of the contact column at rates of 5.2 kg/H and 0.8 $m^3$/H respectively, and under vacuum pressure of −65 kPa, the bad odor component of the soy milk was transferred to the steam, and then condensed in the first and the second cooling condensers, yielding 760 g of a bad odor component liquid.

Upon checking the flavor of the soy milk which had undergone the process described above, it was confirmed that the distasteful odor of the soy milk had been almost entirely eliminated, resulting in an excellent soy milk. In addition, the results of analyzing the soy milk and the deodorized liquid thereof using the same methods as in the example 2 are shown in FIG. 12.

Figure 12:
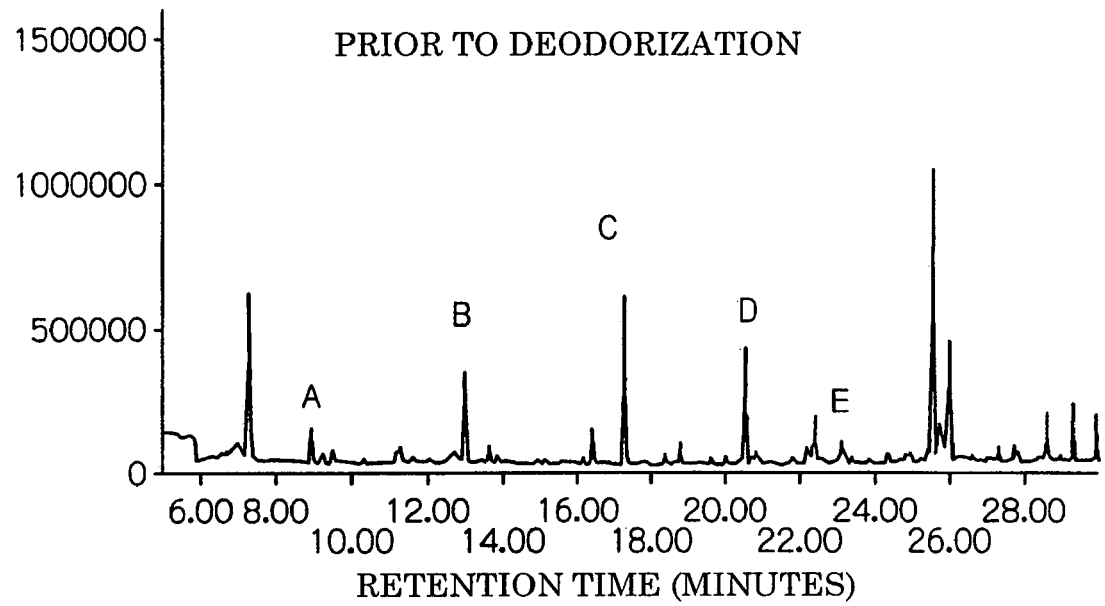
FIG. 12 shows chromatography results of element transfer measurements before and after processing of soy milk in an example 6 of the present invention.
Figure 12:
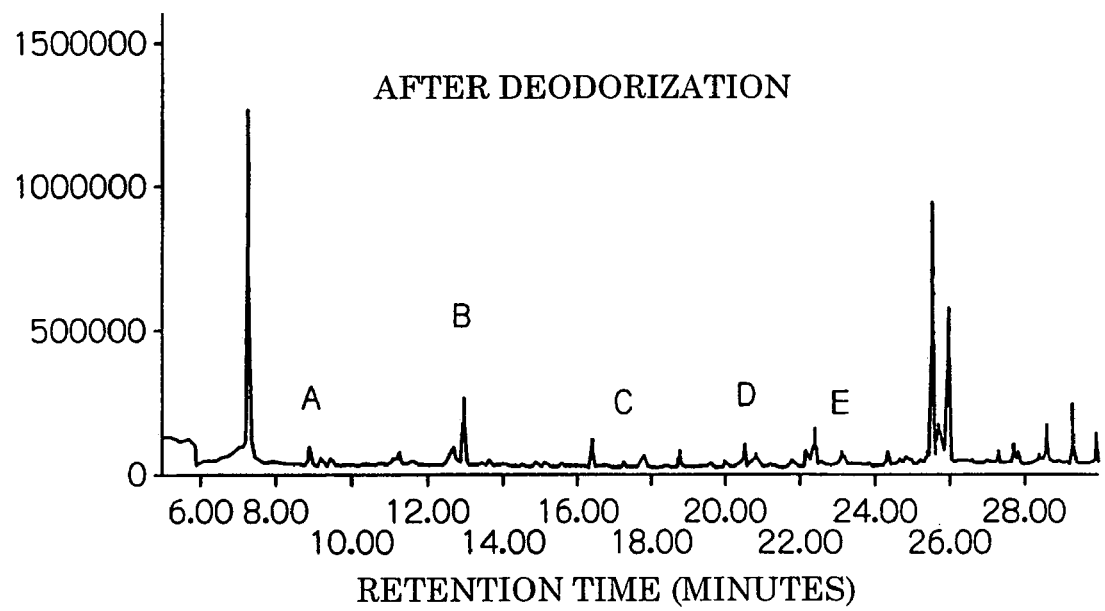

For example, the substance D in FIG. 12 (1-octen-3-ol) is a typical bad odor component of soy milk, and was determined to have been removed with a rejection ratio of 87%. Using conventional technology, over the same vapor-liquid contacting time as this example (20 seconds), the rejection ratio was approximately 60 to 70%.

Example 7

Next is a description of an example of an aroma component production method using a device which is a scaled up version of the device in the example 1.

In example 7, the device is of the same construction as in the example 1, but employs a larger scale contact column provided with 50 pairs of rotors and trays.

Coffee beans known as "washed mocha" (made by Unicoffee Co. Ltd.) were ground in a coffee mill, and 100 kg of ground coffee beans was extracted in hot water at 93° C., to obtain 1000 kg of a coffee extracted liquid.

The obtained coffee extracted liquid was supplied to the supply column at a temperature of 50° C. and a supply rate of 300 L/H. The rotational speed of the rotor was set to 3 $s^{-1}$ (180 rpm), and steam and a 90° C. hot blast of air were blown in from the bottom of the contact column at rates of 34 kg/H and 14 $m^3$/H respectively, and under vacuum pressure of −50 kPa, the aroma component of the coffee extracted liquid was transferred to the steam.

The steam was condensed in the first and the second cooling condensers, yielding 65 kg of an aroma component liquid. The obtained aroma component liquid gave a very strong impression of a fresh coffee flavor, and was a very favorable product.

Adding a small amount of the obtained aroma component liquid dropwise to commercially available milk yielded a coffee milk beverage with a good flavor.

Example 8

Next is a description of an example of a deodorizing method using a scaled up version of the device from the example 1.

200 kg of a whey powder (a product of Milei GMBH of Germany) was dissolved in hot water of temperature 60° C. in five parts using a super mixer (a product of Morinaga Engineering Co. Ltd.), to prepare a total of 2000 kg of an aqueous solution of whey.

The prepared aqueous solution of whey was supplied to the contact column of the vapor-liquid contacting equipment from the example 7, at a temperature of 50° C. and a supply rate of 500 L/H.

The rotational speed of the rotor was set to 5 $s^{-1}$ (300 rpm), and steam and a 100° C. hot blast of air were blown in from the bottom of the contact column at rates of 60 kg/H and 20 $m^3$/H respectively, and under vacuum pressure of −65 kPa, the bad odor component of the aqueous solution of whey was transferred to the steam. The steam was then condensed in the first and the second cooling condensers, yielding 180 kg of a condensate containing the bad odor component.

2140 kg of the deodorized aqueous solution of whey, produced by removing the bad odor component, was obtained. The unpleasant whey flavor had been removed from this deodorized aqueous solution of whey, which had a pleasant flavor.

INDUSTRIAL APPLICABILITY

According to the vapor-liquid contacting equipment and the vapor-liquid contacting method of the present invention, by providing rotors having furrows which the test liquid flows over when the filmy test liquid flows out from the center of the rotor towards the outer periphery, the vapor-liquid contacting efficiency is increased, continuous operation over extended periods is possible, and the investment cost and the running costs can be reduced. Moreover, the space required for installation can be reduced.

The invention claimed is:

1. A vapor-liquid contacting equipment comprising:
   at least one rotor which spreads a test liquid into a thin film by centrifugal force and causes contact with an ambient vapor; and
   a plurality of stirring members, each one of said stirring members comprising an upright plate, said stirring members arranged in an upright state at equal intervals around the outer periphery of said rotor, said stirring members stirring said test liquid discharged from the outer periphery of said rotor,
   wherein said rotor has at least one furrow for said test liquid to flow over when the filmy test liquid flows out from the center of the rotor towards an outer periphery.

2. A vapor-liquid contacting equipment comprising:
   a contact column in which an inlet for a test liquid and an outlet for a vapor are provided at the top, and an outlet for the test liquid and an inlet for the vapor are provided at the bottom;
   a rotary shaft which is inserted vertically in said contact column;
   a plurality of rotors which are provided on the rotary shaft with gaps provided therebetween and which convert the test liquid into a thin film by centrifugal force and then discharge the test liquid from an outer periphery thereof;
   a plurality of stirring members, each one of said stirring members comprising an upright plate, said stirring members arranged in an upright state at equal intervals around the outer periphery of said rotor, said stirring members stirring said test liquid discharged from the outer periphery of said rotor; and
   trays which receive the test liquid discharged from an upper rotor and guide the test liquid to the center of a lower rotor,
   wherein said rotors have at least one furrow which said test liquid flows over when said filmy test liquid flows out from the center of said rotors towards the outer periphery.

3. A vapor-liquid contacting equipment according to either one of claim 1 and claim 2, wherein said rotor is a disc, and said furrows are formed at constant intervals in the circumferential direction on an upper surface of said disc, and each of said furrows are inclined relative to a radial direction, so that those sections of the furrows closer to the outer periphery of said disc are positioned further forward in the rotational direction of the disc than those sections nearer the center of the disc.

4. A vapor-liquid contacting equipment according to either one of claim 1 and claim 2, wherein said furrows are formed by evaginating a portion of a flat section of said rotor upwards, and said furrows are curved so as to be concave towards the front in the rotational direction of said rotor.

5. A vapor-liquid contacting equipment according to either one of claim 1 and claim 2, wherein said rotor has openings for vapor transmission formed through said rotor, and uprising sections formed at the front edge of said openings in the rotational direction, which lift up said filmy test liquid.

6. A vapor-liquid contacting method including a process in which, by rotating at least one rotor and then supplying a test liquid onto said rotor, said test liquid is converted into a thin film by centrifugal force, and flows out from a center of said rotor to an outer periphery, while contacting an ambient vapor,
   wherein by using a rotor in which at least one furrow is formed on said rotor, said test liquid flows over said furrow when said filmy test liquid flows out from the center of said rotor towards the outer periphery, and
   by using a plurality of stirring members, each one of said stirring members comprising an upright plate, said stirring members arranged in an upright state at equal intervals around the outer periphery of said rotor, said test liquid discharged from the outer periphery of said rotor is stirred.

7. A vapor-liquid contacting method comprising a process in which, using a vapor-liquid contacting equipment comprising:
   a contact column in which an inlet for a test liquid and an outlet for a vapor are provided at the top, and an outlet for the test liquid and an inlet for the vapor are provided at the bottom;
   a rotary shaft which is inserted vertically in said contact column;
   a plurality of rotors which are provided on said rotary shaft with gaps provided therebetween and which convert the test liquid into a thin film by centrifugal force and then discharge the test liquid from the outer periphery thereof;
   a plurality of stirring members, each one of said stirring members comprising an upright plate, said stirring members arranged in an upright state at equal intervals around the outer periphery of said rotor; and
   trays which receive the test liquid discharged from an upper rotor and guide the test liquid to the center of a lower rotor,
   wherein said rotors have furrows which said test liquid flows over when the filmy test liquid flows out from the center of said rotor towards the outer periphery,
   the test liquid is sent flowing down from above said rotors which are positioned at different heights, while a vapor is sent flowing from the vapor inlet to the vapor outlet, thereby achieving contact between the filmy test liquid and the vapor, and
   the test liquid discharged from the outer periphery of said rotor is stirred by using said stirring members.

8. A vapor-liquid contacting method according to either one of claim 6 and claim 7, wherein said rotor is a disc, and said furrows are formed at constant intervals in the circumferential direction on an upper surface of said disc, and each of said furrows are inclined relative to a radial direction, so that those sections of the furrows closer to the outer periphery of said disc are positioned further forward in the rotational direction of the disc than those sections nearer the center of the disc.

9. A vapor-liquid contacting method according to either one of claim 6 and claim 7, wherein said furrows are formed by evaginating a portion of a flat section of said rotor upwards, and said furrows are curved so as to be concave towards the front in the rotational direction of said rotor.

10. A vapor-liquid contacting method according to either one of claim 6 and claim 7, wherein said rotor is formed with openings formed through said rotor, and uprising sections formed at the front edge of said openings in the rotational direction, which lift up said filmy test liquid,
and said test liquid and vapor are contacted even in a process where vapor passes through said openings and flows from the bottom to top of said rotor, and said test liquid is raised up by said uprising section and jumps over said opening.

11. A liquid deodorizing method which uses a vapor-liquid contacting method according to either one of claim 6 and claim 7, to transfer a bad odor component of a test liquid containing a bad odor component to steam, and thereby deodorize the test liquid.

12. An aroma component production method which uses a vapor-liquid contacting method according to either one of claim 6 and claim 7, to transfer an aroma component of a test liquid containing an aroma component to steam, and obtains said aroma component from the steam.

13. A food or beverage containing an aroma component obtained by the aroma component production method according to claim 12.

14. An aroma component production method according to claim 12, wherein a plant extract is used for said test liquid.

15. A food or beverage containing an aroma component obtained by the aroma component production method according to claim 14.

16. A vapor-liquid contacting equipment comprising:
at least one rotor which spreads a test liquid into a thin film by centrifugal force and causes contact with an ambient vapor; and
at least one stirring member disposed near the outside of said rotor that stirs said test liquid discharged from the outer periphery of said rotor,
wherein said rotor has at least one furrow for said test liquid to flow over when the filmy test liquid flows out from the center of the rotor towards an outer periphery, and
said rotor has openings for vapor transmission formed through said rotor, uprising sections formed at the front edge of said openings in the rotational direction, which lift up said filmy test liquid, and a stirring impeller formed at the back edge of said openings in the rotational direction, which passes said vapor through said openings.

17. A vapor-liquid contacting method including a process in which, by rotating at least one rotor and then supplying a test liquid onto said rotor, said test liquid is converted into a thin film by centrifugal force, and flows out from a center of said rotor to an outer periphery, while contacting an ambient vapor,
wherein by using a rotor in which at least one furrow is formed on said rotor, said test liquid flows over said furrow when said filmy test liquid flows out from the center of said rotor towards the outer periphery, and
by using at least one stirring member disposed near the outside of said rotor, said test liquid discharged from the outer periphery of said rotor is stirred, and
said rotor is formed with openings formed through said rotor, uprising sections formed at the front edge of said openings in the rotational direction, which lift up said filmy test liquid, and a stirring impeller formed at the back edge of said openings in the rotational direction, which makes said vapor pass through said openings, and
said test liquid and vapor are contacted even in a process where vapor passes through said openings and flows from the bottom to top of said rotor, and said test liquid is raised up by said uprising section and jumps over said opening.

18. A vapor-liquid contacting equipment comprising:
a contact column in which an inlet for a test liquid and an outlet for a vapor are provided at the top, and an outlet for the test liquid and an inlet for the vapor are provided at the bottom;
a rotary shaft which is inserted vertically in said contact column;
a plurality of rotors which are provided on the rotary shaft with gaps provided therebetween and which convert the test liquid into a thin film by centrifugal force and then discharge the test liquid from an outer periphery thereof;
at least one stirring member disposed near the outside of said rotor that stirs said test liquid discharged from the outer periphery of said rotor; and
trays which receive the test liquid discharged from an upper rotor and guide the test liquid to the center of a lower rotor,
wherein said rotors have at least one furrow which said test liquid flows over when said filmy test liquid flows out from the center of said rotors towards the outer periphery, and
said rotor has openings for vapor transmission formed through said rotor, uprising sections formed at the front edge of said openings in the rotational direction, which lift up said filmy test liquid, and a stirring impeller formed at the back edge of said openings in the rotational direction, which passes said vapor through said openings.

19. A vapor-liquid contacting method comprising a process in which, using a vapor-liquid contacting equipment comprising:
a contact column in which an inlet for a test liquid and an outlet for a vapor are provided at the top, and an outlet for the test liquid and an inlet for the vapor are provided at the bottom;
a rotary shaft which is inserted vertically in said contact column;
a plurality of rotors which are provided on said rotary shaft with gaps provided therebetween and which convert the test liquid into a thin film by centrifugal force and then discharge the test liquid from the outer periphery thereof;
at least one stirring member disposed near the outside of said rotor; and
trays which receive the test liquid discharged from an upper rotor and guide the test liquid to the center of a lower rotor,
wherein said rotors have furrows which said test liquid flows over when the filmy test liquid flows out from the center of said rotor towards the outer periphery,
the test liquid is sent flowing down from above said rotors which are positioned at different heights, while a vapor is sent flowing from the vapor inlet to the vapor outlet, thereby achieving contact between the filmy test liquid and the vapor, and
the test liquid discharged from the outer periphery of said rotor is stirred by using said stirring member, and said rotor is formed with openings formed through said rotor, uprising sections formed at the front edge of said openings in the rotational direction, which lift up said filmy test liquid, and a stirring impeller formed at the back edge of said openings in the rotational direction, which makes said vapor pass through said openings, and said test liquid and vapor are contacted even in a process where vapor passes through said openings and flows from the bottom to top of said rotor, and said test liquid is raised up by said uprising section and jumps over said opening.

* * * * *